US006437268B1

(12) United States Patent
Etscheidt et al.

(10) Patent No.: US 6,437,268 B1
(45) Date of Patent: Aug. 20, 2002

(54) CIRCUIT BREAKER TERMINAL CONNECTOR

(75) Inventors: Ronald Etscheidt, Anamosa, CA (US); Donald Nohavec, Lincoln, NE (US); Joni Orum, Atkins, IA (US); Douglas Thomas, Milford, NE (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/773,814

(22) Filed: Jan. 31, 2001

(51) Int. Cl.[7] ............................ H01H 1/00; H02B 1/04; H01R 4/28

(52) U.S. Cl. ....................... 200/305; 361/634; 439/810; 439/814; 335/202

(58) Field of Search ......................... 200/284, 293–296, 200/303–305, 400, 405, 500, 501; 218/1, 22, 30–33, 146, 155; 361/87, 93, 94, 600, 602, 611, 622–625, 627–629, 631, 632, 634, 637, 639, 640, 641, 643, 644, 647, 648, 652, 656, 679, 823, 824, 827; 439/620–622, 715, 716, 723, 724, 769, 776–789, 801–815; 335/202

(56) References Cited

U.S. PATENT DOCUMENTS

| | | | | | |
|---|---|---|---|---|---|
| 4,093,970 | A | | 6/1978 | M'Sadoques et al. | 361/361 |
| 4,809,132 | A | * | 2/1989 | Palmieri et al. | 335/202 |
| 4,825,338 | A | | 4/1989 | Hubbard et al. | 361/376 |
| 5,005,104 | A | * | 4/1991 | Grunert et al. | 335/202 |
| 5,107,396 | A | * | 4/1992 | Rosen et al. | 361/634 |
| 5,978,208 | A | * | 11/1999 | Helms et al. | 200/284 |
| 6,084,188 | A | * | 7/2000 | Mueller et al. | 200/305 |

* cited by examiner

*Primary Examiner*—Michael Friedhofer
(74) *Attorney, Agent, or Firm*—Larry I. Golden

(57) ABSTRACT

An improved connector comprises a circuit breaker terminal having a cold formed, countersink aperture on a top surface of the breaker terminal and an extruded raised ring on the bottom surface of the breaker terminal. The wire connector is a square-shaped element having a plurality of openings for receipt of at least one wire, the circuit breaker terminal and the wire connector shoe. In assembly of the three piece connector, the circuit breaker terminal is inserted into an opening in the wire connector. The wire connector shoe is then inserted into at least one opening in the wire connector and surrounds a portion of the circuit breaker terminal within the wire connector. The wire connector shoe has a protrusion, which is cold formed by displacing shoe material into the countersink aperture on the top surface of the circuit breaker terminal. The protrusion mechanically adheres to the top surface material defining the countersink aperture and the extruded raised ring mechanically adheres to an interior surface of the wire connector which defines a bottom surface aperture thereby securely attaching the wire connector shoe, wire connector and circuit breaker terminal.

8 Claims, 4 Drawing Sheets

CIRCUIT BREAKER TERMINAL CONNECTOR

BACKGROUND OF THE INVENTION

1. Field of the Invention

This invention relates generally to a circuit breaker and more particularly to a circuit breaker terminal connector which allows for attachment of a circuit breaker terminal, wire connector and wire connector shoe without the use of any additional binding or attaching element(s).

2. Description of the Related Art

Circuit breakers are widely used in residential and industrial application for the interruption of electrical current in power lines upon conditions of severe overcurrent caused by short circuits or ground faults.

Circuit breaker terminals are used to electrically couple the circuit breaker to a power source ("line") and the load to be protected. In order to secure the line or load to the circuit breaker terminal a wire connector and wire connector shoe are used in combination with the circuit breaker terminal and a rivet.

Prior art terminal connectors comprise a wire connector having top and bottom apertures and a plurality of aligned, grooved side apertures. The top aperture of the wire connector allows for receipt of at least one wire and the plurality of grooved apertures allow for receipt of the circuit breaker terminal and wire connector shoe. The circuit breaker terminal contains an aperture at one end and is electrically coupled to the circuit breaker circuitry at an opposing end.

Assembly of the prior art terminal connector requires the insertion of the circuit breaker terminal into a side aperture of the wire connector until the circuit breaker terminal aperture is aligned with the top and bottom apertures of the wire connector. The wire connector shoe, also having at least one aperture, is inserted into a side aperture of the wire connector, directly across from the side aperture in which the circuit breaker terminal is inserted and over the circuit breaker terminal. The wire connector shoe aperture is aligned with the top and bottom apertures of the wire connector and the circuit breaker terminal aperture. Once these three pieces were assembled and aligned, a rivet is inserted through the top aperture of the wire connector, the wire connector shoe aperture, the circuit breaker terminal aperture and the bottom aperture of the wire connector to secure the breaker terminal, wire connector and wire connector shoe together.

Use of a rivet in attaching the wire connector and wire connector shoe to the breaker terminal adds complexity in the assembly of the terminal connector. Additionally, when a rivet is available from a single source, procurement may be difficult. Elimination of the rivet would simplify design and implementation of automation equipment for the assembly of the prior art terminal connector in that the need for bowl feeding, placement and installation of the rivet would be eliminated. Therefore, elimination of the rivet in a terminal connector would reduce product, procurement and stocking costs.

SUMMARY OF THE INVENTION

The present invention provides an improved connector on a terminal of an overload responsive circuit breaker. The connector is inexpensive, readily manufactured and installed and firmly secures a wire connector and wire connector shoe to a circuit breaker terminal, which is electrically coupled to the circuit breaker circuitry. The improved connector of this invention comprises a circuit breaker terminal having a cold formed, countersink aperture on a top surface of the breaker terminal and an extruded raised ring on the bottom surface of the breaker terminal. The wire connector is a square-shaped element having a plurality of openings for receipt of at least one wire, the circuit breaker terminal and the wire connector shoe. In assembly of the three piece connector, the circuit breaker terminal is inserted into an opening in the wire connector. The wire connector shoe is then inserted into at least one opening in the wire connector and surrounds a portion of the circuit breaker terminal within the wire connector. The wire connector shoe has a protrusion, which is cold formed by displacing shoe material into the countersink aperture on the top surface of the circuit breaker terminal. The protrusion mechanically adheres to the top surface material defining the countersink aperture and the extruded raised ring mechanically adheres to an interior surface of the wire connector which defines a bottom surface aperture thereby securely attaching the wire connector shoe, wire connector and circuit breaker terminal.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

Figure 1:
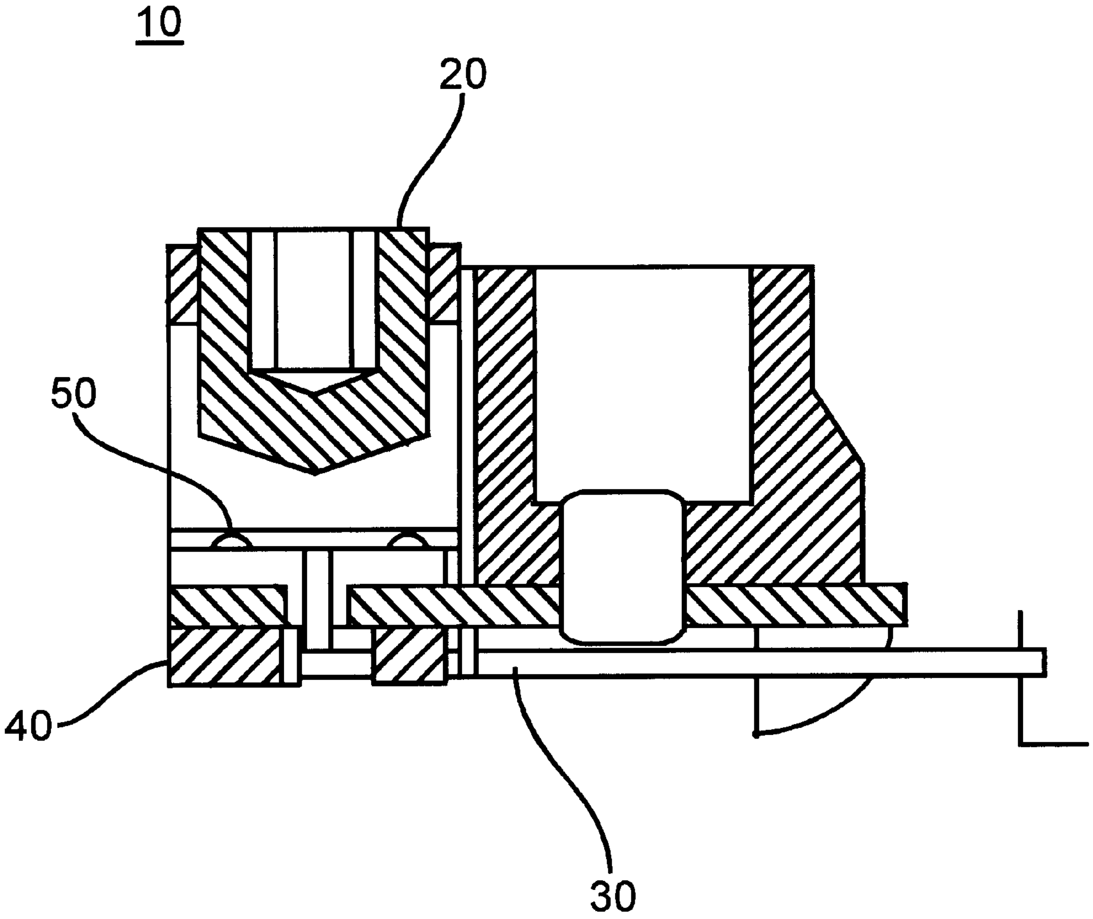
FIG. 1 is a sectional view of a prior art terminal connector wherein a rivet is used to attach a circuit breaker terminal, wire connector and wire connector shoe.

FIG. 1 is a sectional view of a prior art terminal connector 10 comprising a wire connector 20 having a top aperture, a bottom aperture and a plurality of aligned, grooved side apertures. The top aperture of the wire connector 20 allows for receipt of at least one wire (not shown), while the plurality of grooved apertures allow for receipt of a circuit breaker terminal 30 and a wire connector shoe 40. The circuit breaker terminal 30 contains an aperture at one end and is electrically coupled to the circuit breaker circuitry (not shown) at an opposing end. In assembling the terminal connector 10, the circuit breaker terminal 30 is inserted into a side aperture of the wire connector 20 until the circuit breaker terminal aperture is aligned with the top aperture and bottom aperture of the wire connector 20. The wire connector shoe 40, also having at least one aperture, is inserted into a side aperture of the wire connector 20, directly across from the side aperture in which the circuit breaker terminal 30 is inserted, and over the circuit breaker terminal 30. The wire connector shoe aperture is aligned with the top aperture and bottom aperture of the wire connector and the circuit breaker terminal aperture. Once these three pieces are assembled and aligned, a rivet 50 is inserted through the top aperture of the wire connector 20, the wire connector shoe aperture, the circuit breaker terminal aperture and the bottom aperture of the wire connector to secure the breaker terminal 30, wire connector 20 and wire connector shoe 40 together.

As stated above, the rivet 50 may be available from a single source and may be difficult to procure. Therefore, elimination of the rivet 50 reduces procurement costs, stocking issues, simplifies design and implementation of automation equipment for the assembly of the terminal connector.

Figure 2:
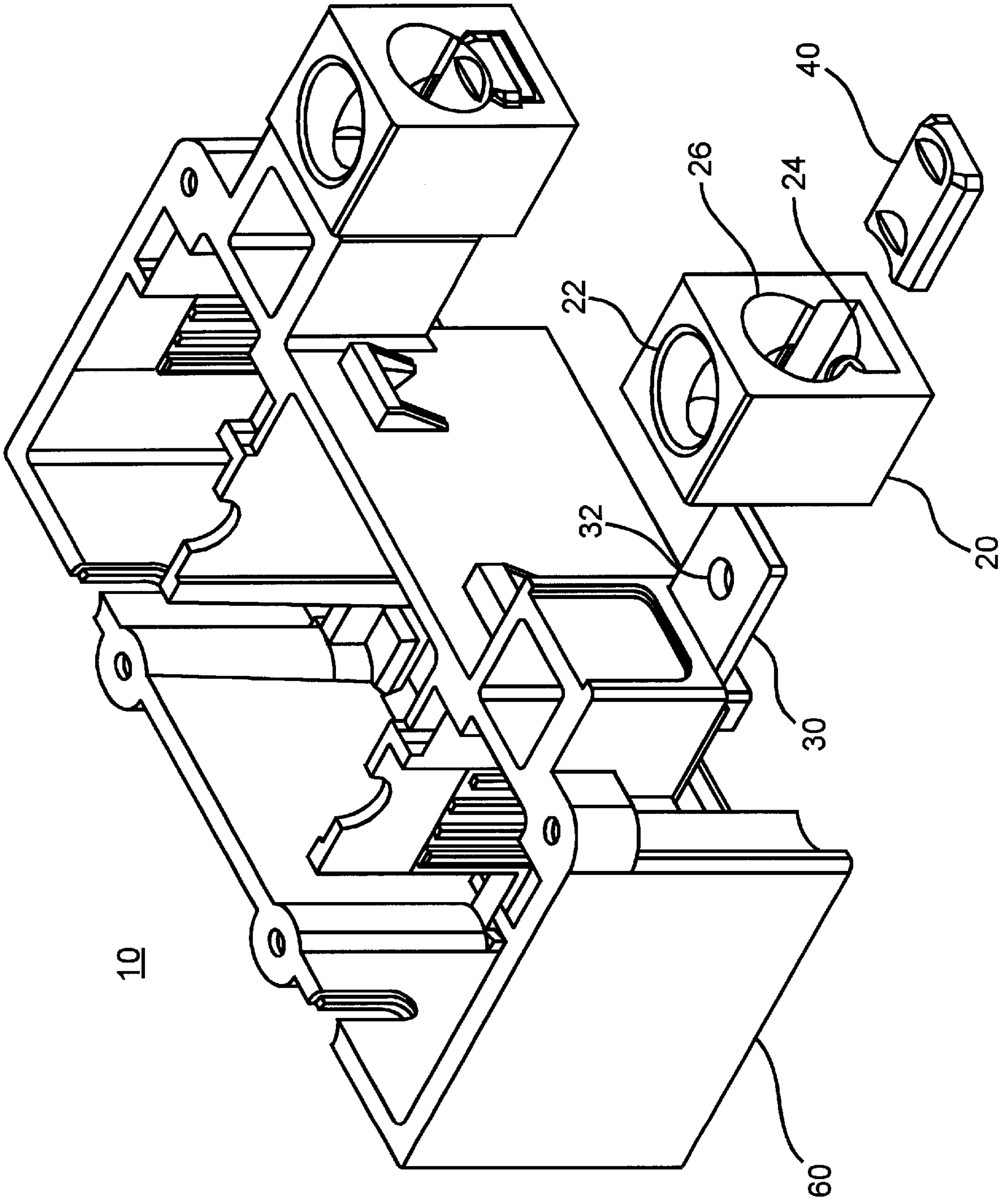
FIG. 2 is a perspective view of a circuit breaker housing and terminal connector, illustrating the attachment of the wire connector shoe and wire connector to the circuit breaker terminal in accordance with the present invention.

FIG. 2 is a perspective view of a circuit breaker housing 60, illustrating a terminal connector 10 for attaching the wire connector shoe 40 and wire connector 20 to the circuit breaker terminal 30 in accordance with the present invention.

The circuit breaker terminal 30 is cold formed after calibration and prior to packaging of the circuit breaker. Cold forming of the circuit breaker terminal 30 may be performed using any one of a number of methods well known in the art. One method of cold forming the breaker terminal 30 is to use a tool or other element, having a greater material strength than that of the breaker terminal material, to simply strike and plastically deform the breaker terminal 30. Common metals used in the construction of breaker terminals include aluminum, brass or copper. The cold form operation is used to create a countersink aperture 32 on the top surface of the breaker terminal 30 and an extruded raised ring 34 (see FIGS. 3 & 4) on the bottom surface of one end of the breaker terminal 30.

Figure 3:
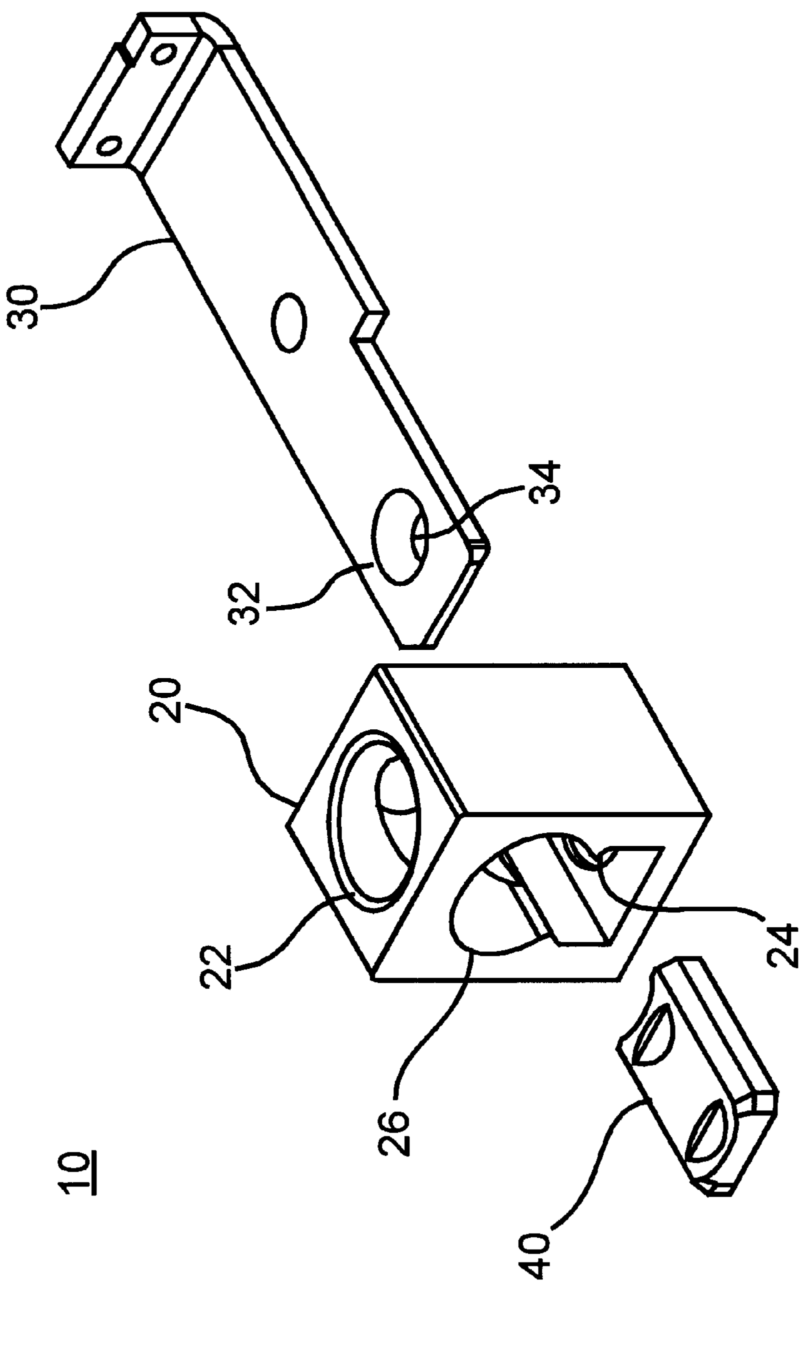
FIG. 3 is an exploded view of a circuit breaker terminal, wire connector and wire connector shoe in accordance with the present invention.
Figure 4:
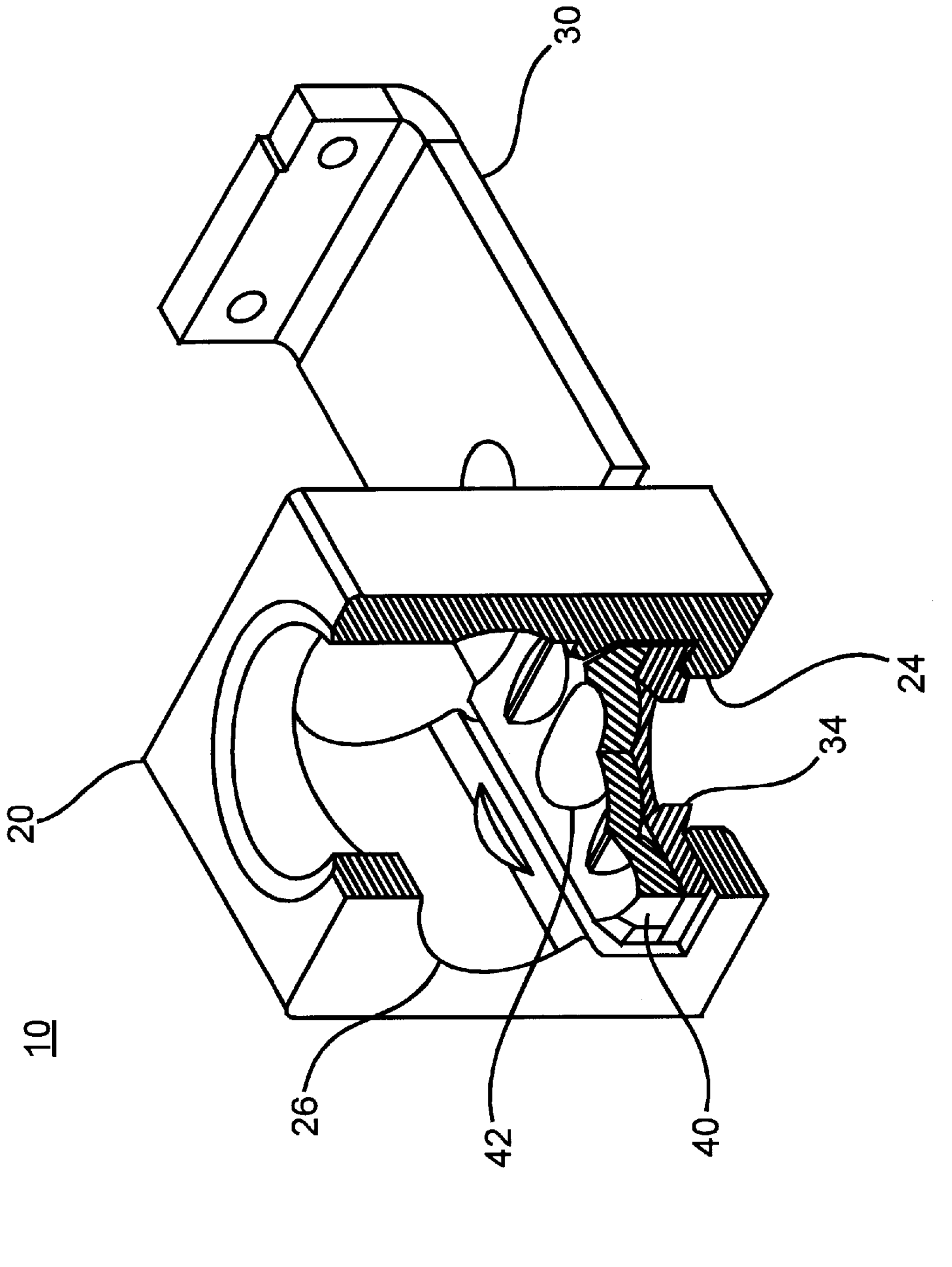
FIG. 4 is a sectional view of a circuit breaker terminal, wire connector and wire connector shoe in accordance with the present invention.

After the breaker terminal 30 is formed, the wire connector 20 is assembled. As shown in FIGS. 2–4, the wire connector 20 is a square-shaped element having a top aperture 22, a bottom aperture 24 and a plurality of side apertures 26, 28. In the preferred embodiment, the side apertures 26, 28 are aligned and grooved. The top aperture 22 and bottom aperture 24 of the wire connector 20 allow for receipt of at least one wire (not shown), while the plurality of aligned, grooved apertures 26, 28 allow for receipt and guidance of the circuit breaker terminal 30 and the wire connector shoe 40 during assembly.

The breaker terminal 30 is inserted into the grooved side aperture 28 of the wire connector 20 until the countersink aperture 32 is in alignment with the top aperture 22 and the bottom aperture 24 of the wire connector 20 and at least one side of the wire connector 20 is flush with the circuit breaker housing 60 as shown in FIG. 2.

The wire connector shoe 40 is inserted along the grooved side aperture 26 of the wire connector 20, opposite the grooved side aperture 28 in which the breaker terminal 30 is inserted. The wire connector shoe 40 is inserted over the breaker terminal 30 until the wire connector shoe 40 is substantially surrounded by the wire connector 20. Common metals used in the construction of wire connector shoes include aluminum, brass or copper. Illustrated in FIG. 4, a protrusion 42 is cold formed, in the same manner referred to above, by displacing wire connector shoe material into the countersink aperture 32 of the breaker terminal 30. The countersink aperture 32 is used as a forming die during the formation of the protrusion 42 in the wire connector shoe 40 and the material on the top surface of the breaker terminal 30, defining the countersink aperture 32, elastically binds the protrusion 42 upon completion of the forming process. Additionally, the interior material defining the bottom aperture 24 of the wire connector 20 elastically binds the extruded raised ring 34 on the bottom surface of the breaker terminal 30. Therefore, the wire connector 20, wire connector shoe 40 and breaker terminal 30 are permanently attached without the use of an additional binding or attachment element.

The foregoing description is directed to particular embodiments of the present invention for the purpose of illustration and explanation. It will be apparent, however, to one skilled in the art that many modifications and changes to the embodiment set forth are possible without departing from the scope and the spirit of the invention. It is intended that the following claims be interpreted to embrace all such modifications and changes.

What is claimed is:

1. A circuit breaker terminal connector, comprising:

(a) a circuit breaker terminal electrically coupled to a circuit breaker, said circuit breaker terminal having a countersink aperture on a top surface and an extruded raised ring on a bottom surface;

(b) a wire connector shoe having a protrusion formed by displacing a shoe material into said countersink aperture thereby elastically binding said circuit breaker terminal to said wire connector shoe; and (c) a wire connector having a plurality of openings for receipt of said wire connector shoe and said circuit breaker terminal, said wire connector elastically binding said extruded raised ring of said circuit breaker terminal.

2. The circuit breaker terminal connector of claim 1 wherein said circuit breaker terminal is copper.

3. The circuit breaker terminal connector of claim 1 wherein said circuit breaker terminal is aluminum.

4. The circuit breaker terminal connector of claim 1 wherein said circuit breaker terminal is brass.

5. The circuit breaker terminal connector of claim 1 wherein said wire connector shoe is copper.

6. The circuit breaker terminal connector of claim 1 wherein said wire connector shoe is aluminum.

7. The circuit breaker terminal connector of claim 1 wherein said wire connector shoe is brass.

8. A method of assembling a circuit breaker terminal connector, comprising:

(a) cold forming a countersink aperture on a top surface of the circuit breaker terminal;

(b) cold forming an extruded raised ring on a bottom surface of the circuit breaker terminal;

(c) inserting said circuit breaker terminal into a wire connector;

(d) inserting the wire connector shoe into a wire connector and over said circuit breaker terminal; and (e) cold forming a protrusion on said wire connector shoe for elastically binding said circuit breaker terminal to said protrusion and elastically binding said wire connector and said wire connector shoe to said circuit breaker terminal.

* * * * *